United States Patent
Marupaduga et al.

(10) Patent No.: US 11,026,131 B1
(45) Date of Patent: Jun. 1, 2021

(54) DYNAMIC CARRIER RECONFIGURATION TO FACILITATE VOICE-OVER-PACKET COMMUNICATION IN RESPONSE TO PREDICTED UPLINK INTERMODULATION DISTORTION

(71) Applicant: Sprint Spectrum L.P., Overland Park, KS (US)

(72) Inventors: Sreekar Marupaduga, Overland Park, KS (US); Mark Wade, Trimble, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 2 days.

(21) Appl. No.: 15/929,174

(22) Filed: Dec. 3, 2019

(51) Int. Cl.
| | |
|---|---|
| *H04W 36/00* | (2009.01) |
| *H04W 36/22* | (2009.01) |
| *H04L 5/00* | (2006.01) |
| *H04M 7/00* | (2006.01) |
| *H04W 72/04* | (2009.01) |
| *H04W 72/12* | (2009.01) |
| *H04W 56/00* | (2009.01) |

(52) U.S. Cl.
CPC ......... *H04W 36/0027* (2013.01); *H04L 5/001* (2013.01); *H04L 5/0098* (2013.01); *H04M 7/006* (2013.01); *H04W 36/22* (2013.01); *H04W 56/0045* (2013.01); *H04W 72/0453* (2013.01); *H04W 72/1263* (2013.01)

(58) Field of Classification Search
None
See application file for complete search history.

(56) References Cited

U.S. PATENT DOCUMENTS

| | | | |
|---|---|---|---|
| 9,473,286 B1 | 10/2016 | Shipley et al. | |
| 10,123,339 B1 | 11/2018 | Bertz et al. | |
| 2013/0044621 A1* | 2/2013 | Jung | H04L 5/0007 370/252 |
| 2013/0215811 A1* | 8/2013 | Takaoka | H04W 28/0268 370/311 |
| 2014/0003363 A1 | 1/2014 | Hart et al. | |
| 2015/0245365 A1* | 8/2015 | Isokangas | H04L 5/0096 455/423 |
| 2017/0332288 A1* | 11/2017 | Sadek | H04L 1/1854 |
| 2019/0229954 A1* | 7/2019 | Kazmi | H04L 5/001 |
| 2020/0045720 A1* | 2/2020 | Abdel Shahid | H04W 72/14 |
| 2020/0235903 A1* | 7/2020 | Kim | H04W 72/12 |

* cited by examiner

*Primary Examiner* — Kenny S Lin

(57) ABSTRACT

When an access node is providing a UE with carrier-aggregation service on a PCell in combination with one or more SCells and the UE engages in a voice call including uplink voice communication on the PCell, the access node will determine that there is a threshold high level of IMD on the uplink resulting from concurrent downlink transmissions, and the access node will responsively swap the UE's PCell with one of the UE's one or more SCells. In a representative implementation, the decision to swap these carriers in the UE's connection could be based on a further determination that the level of IMD on the uplink of the SCell is not threshold high.

20 Claims, 4 Drawing Sheets

WHEN AN ACCESS NODE OF A CELL SITE PROVIDES A UE WITH CARRIER-AGGREGATION SERVICE ON A CONNECTION ENCOMPASSING AT LEAST A FIRST CARRIER CONFIGURED AS A PCELL FOR THE CARRIER-AGGREGATION SERVICE AND A SECOND CARRIER CONFIGURED AS AN SCELL FOR THE CARRIER-AGGREGATION SERVICE, MAKE A FIRST DETERMINATION THAT THERE IS A PREDEFINED THRESHOLD HIGH EXTENT OF INTERMODULATION DISTORTION ON AN UPLINK CHANNEL OF THE FIRST CARRIER RESULTING FROM CONCURRENT DOWNLINK TRANSMISSIONS FROM THE CELL SITE AND MAKE A SECOND DETERMINATION THAT THE UE WILL ENGAGE IN A VOP COMMUNICATION — 36

RESPONSIVE TO A COMBINATION OF AT LEAST THE FIRST DETERMINATION AND THE SECOND DETERMINATION, SWAP THE FIRST CARRIER AND SECOND CARRIER IN THE CONNECTION, WITH THE SWAPPING MAKING THE SECOND CARRIER THE PCELL OF THE CARRIER-AGGREGATION SERVICE AND MAKING THE FIRST CARRIER THE SCELL OF THE CARRIER-AGGREGATION SERVICE — 38

```
┌─────────────────────────────────────┐
│ WHEN AN ACCESS NODE OF A CELL SITE  │
│ PROVIDES A UE WITH CARRIER-         │
│ AGGREGATION SERVICE ON A            │
│ CONNECTION ENCOMPASSING AT LEAST A  │
│ FIRST CARRIER CONFIGURED AS A PCELL │
│ FOR THE CARRIER-AGGREGATION         │
│ SERVICE AND A SECOND CARRIER        │
│ CONFIGURED AS AN SCELL FOR THE      │
│ CARRIER-AGGREGATION SERVICE, MAKE A │
│ FIRST DETERMINATION THAT THERE IS A │──36
│ PREDEFINED THRESHOLD HIGH EXTENT OF │
│ INTERMODULATION DISTORTION ON AN    │
│ UPLINK CHANNEL OF THE FIRST CARRIER │
│ RESULTING FROM CONCURRENT DOWNLINK  │
│ TRANSMISSIONS FROM THE CELL SITE    │
│ AND MAKE A SECOND DETERMINATION     │
│ THAT THE UE WILL ENGAGE IN A VOP    │
│ COMMUNICATION                       │
└─────────────────────────────────────┘
                    │
                    ▼
┌─────────────────────────────────────┐
│ RESPONSIVE TO A COMBINATION OF AT   │
│ LEAST THE FIRST DETERMINATION AND   │
│ THE SECOND DETERMINATION, SWAP THE  │
│ FIRST CARRIER AND SECOND CARRIER IN │
│ THE CONNECTION, WITH THE SWAPPING   │
│ MAKING THE SECOND CARRIER THE PCELL │──38
│ OF THE CARRIER-AGGREGATION SERVICE  │
│ AND MAKING THE FIRST CARRIER THE    │
│ SCELL OF THE CARRIER-AGGREGATION    │
│ SERVICE                             │
└─────────────────────────────────────┘
```

Fig. 2

DYNAMIC CARRIER RECONFIGURATION TO FACILITATE VOICE-OVER-PACKET COMMUNICATION IN RESPONSE TO PREDICTED UPLINK INTERMODULATION DISTORTION

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that may provide connectivity with various application servers and/or transport networks, such as the public switched telephone network (PSTN) and/or the Internet for instance. With this arrangement, a UE within coverage of the cellular network could engage in air interface communication with an access node and may thereby communicate via the access node with various application servers and/or other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of radio access technologies, in a continuous effort to increase available data rate and quality of service. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And more recently, the industry has been exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use. Each such frequency channel could have a respective bandwidth centered on a respective center frequency, defining a respective range of frequency extending from a low-end frequency to a high-end frequency.

Further, on the downlink and uplink respectively, the air interface defined by each carrier under an example RAT could be structured to define physical air-interface resources for carrying information between the access node and UEs.

Without limitation for instance, the air interface could be divided over time into frames, which could be divided in turn into subframes, timeslots, and symbol time-segments. And the carrier bandwidth (frequency width of the carrier on the downlink and/or uplink) could be divided over frequency into subcarriers. As a result, the air interface could define an array of resource elements per subframe, each occupying a respective subcarrier and spanning a respective symbol time segment, and the subcarrier of each such resource element could be modulated using an applicable modulation scheme to carry data over the air. Further, the air interface could be configured to group these resource elements into physical resource blocks (PRBs) across the carrier bandwidth, and the access node could be configured to allocate some or all of these PRBs for use to carry data on an as-needed basis.

OVERVIEW

When a UE enters into coverage of an example network, the UE could detect threshold strong coverage of an access node on a carrier and could then engage in random-access and Radio Resource Control (RRC) signaling to establish an RRC connection with the access node on that carrier. Further, if the UE is not already registered for service with the core network, the UE could transmit to the access node an attach request, which the access node could forward to a core-network controller for processing. And the core-network controller could then coordinate setup for the UE of one or more user-plane bearers for carrying packet-data communications between the UE and a core-network gateway that provides packet-network connectivity.

Once the UE is so connected and registered, the access node could then serve the UE in a connected mode on the carrier, managing downlink air-interface communication of packet data to the UE and uplink air-interface communication of packet data from the UE.

For instance, when data arrives at the access node for transmission to the UE, the access node could buffer the data pending transmission to the UE, and the access node could select and allocate one or more downlink PRBs in an upcoming subframe for use to transmit at least a portion of the data, defining a transport block, to the UE. The access node could then transmit to the UE in a control channel of that subframe a Downlink Control Information (DCI) message that designates the downlink PRBs, and the access node could accordingly transmit the transport block to the UE in those designated downlink PRBs, such as by modulating the subcarriers of resource elements in those PRBs to carry symbols representing the data.

And when the UE has data to transmit to the access node, the UE could buffer the data pending transmission to the access node and could transmit to the access node a scheduling request that carries with it a buffer status report (BSR) indicating how much data the UE has buffered for transmission. And in response, the access node could select and allocate one or more uplink PRBs in an upcoming subframe for carrying a transport block of that data from the UE and could transmit to the UE (in a downlink control channel of a preceding subframe) a DCI message that designates those upcoming uplink PRBs. The UE could then accordingly transmit the transport block to the access node in the designated uplink PRBs, such as by modulating the subcarriers of resource elements in those PRBs to carry symbols representing the data.

In an example implementation, as an access node serves a UE on a given carrier, the bandwidth of the carrier may define an effective limit on the peak rate of data communication between the access node and the UE, as the bandwidth would define only a limited number of air-interface resources (e.g., PRBs) per unit time that could be allocated for use to carry data communications. Further, the data rate available on the carrier could also be limited by the access node serving multiple UEs at once on the carrier, with the access node allocating PRBs per unit time among the various served UEs.

One way to help overcome this per-carrier data rate limitation is to have an access node serve a UE on multiple carriers at once, providing the UE with "carrier-aggregation" service. With carrier-aggregation service, multiple carriers from either contiguous frequency bands or non-contiguous frequency bands are aggregated together as "component carriers" to increase the overall bandwidth available per subframe by providing more air-interface resources on which the access node can schedule uplink and downlink communication. To configure carrier-aggregation service for a UE, the access node could engage in RRC configuration signaling with the UE to add one or more carriers to the UE's RRC connection. And the access node could then schedule communications with the UE on air-interface resources distributed among those carriers.

In a representative carrier-aggregation implementation, one of the UE's serving carriers (perhaps the one on which the UE initially connects with the access node) is deemed a primary component carrier or primary cell (PCell), while each other of the UE's serving carriers is deemed a secondary component carrier or secondary cell (SCell). In practice, the UE's PCell could function as the anchor for carrying key control signaling between the UE and the access node, such as scheduling requests and DCI messaging for instance. Further, in the representative implementation, the UE's PCell could be used for both downlink and uplink service of the UE, while each SCell in the UE's connection could be used for just downlink service of the UE, to help increase the UE's peak downlink data rate.

Unfortunately, one technical problem that can arise with such a carrier-aggregation implementation is that interference on the uplink of the UE's PCell could impact any uplink communication by the UE. This could be a particular issue if the UE is engaged in a voice-over-packet (VOP) call for instance. When engaged in such a call, data representing voice communication from the UE would be carried on the uplink channel of the UE's PCell. But if there is significant interference on that particular channel, the interference may adversely affect that voice communication, resulting in voice-call quality issues.

One source of interference on the uplink channel of a UE's PCell can be intermodulation distortion (IMD) resulting from concurrent downlink transmissions on two or more downlink channels from the access node or from one or more other entities substantially collocated with the access node. In particular, depending on the frequencies of those concurrent downlink transmissions on at least two downlink channels could combine to produce an intermodulation frequency product, such as a third order intermodulation product, that falls within the uplink channel of the UE's PCell. And that intermodulation product could interfere with the access node's receipt of communications on the uplink channel. For voice communication and other interference-sensitive communications, this interference could pose a particular problem.

Disclosed herein is a mechanism to help address this technical problem.

In accordance with the disclosure, when an access node is providing a UE with carrier-aggregation service on a PCell in combination with one or more SCells and the UE is engaged in a voice call including uplink voice communication on the PCell, the access node will determine that there is a threshold high level of IMD on the uplink resulting from concurrent downlink transmissions, and the access node will responsively swap the UE's PCell with one of the UE's one or more SCells. In a representative implementation, the decision to swap these carriers in the UE's connection could be based on a further determination that the level of IMD on the uplink of the SCell is not threshold high.

To facilitate this process in practice, the access node or another entity could regularly evaluate the level of IMD on the uplink channel of the UE's PCell, by tracking instances of concurrent downlink transmissions that would likely combine to produce IMD falling within that uplink channel. In response to a determination that there has been a threshold great extent of such IMD in the uplink channel, the access node could then swap carriers in the UE's connection, transitioning one of the UE's one or more SCells to be the UE's PCell instead, and transitioning the UE's PCell to be one of the UE's one or more SCells.

These as well as other aspects, advantages and alternatives will become apparent to those reading the following description, with reference where appropriate to the accompanying drawings. Further, it should be understood that the discussion in this overview and elsewhere in this document is provided by way of example only and that numerous variations are possible.

BRIEF DESCRIPTION OF THE DRAWINGS

FIG. 2 is a flow chart depicting an example method in accordance with the disclosure.

DETAILED DESCRIPTION

An example implementation will now be described in the context of a cell site that supports 4G LTE and/or 5G NR service, possibly together with one or more other RATs. However, it should be understood that the principles disclosed herein could extend to apply with respect to other scenarios as well. Further, it should be understood that other variations from the specific arrangements and processes described are possible. For instance, various described entities, connections, functions, and other elements could be added, omitted, distributed, re-located, re-ordered, combined, or changed in other ways. In addition, it should be understood that operations described as being performed by one or more entities could be implemented in various ways, such as by a processor executing instructions stored in non-transitory data storage, along with associated circuitry or other hardware, among other possibilities.

Figure 1:
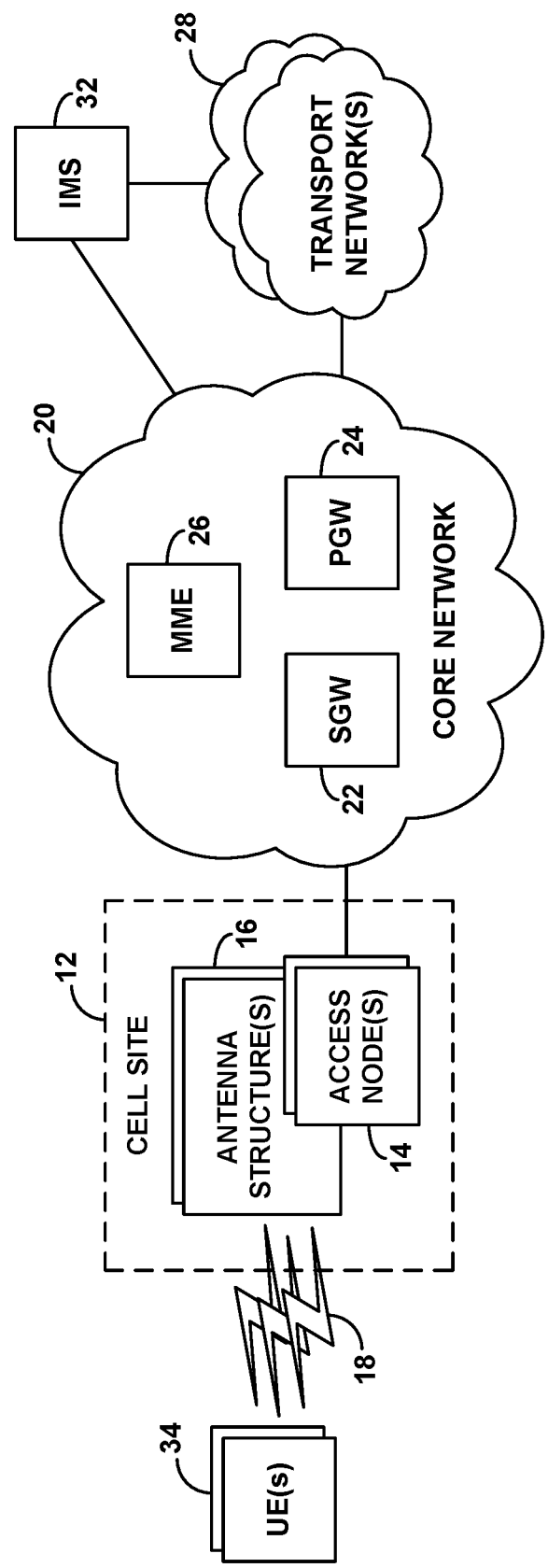
FIG. 1 is a simplified block diagram of an example communication system in which aspects of the present disclosure can be implemented.

FIG. 1 depicts an example cell site 12 that includes one or more access nodes 14 with one or more antenna structures 16, configured to provide coverage and service on one or more carriers 18. In the example implementation, without limitation, at least one of the access nodes 14 is a 4G LTE access node (e.g., evolved Node-B (4G eNB)) or a 5G NR access node (e.g., next generation Node-B (5G gNB)) configured to provide service multiple carriers each structured as described above. Further, the cell site 12 could include one or more additional access nodes configured to provide service according to one or more other RATs, such as any of those noted above, among other possibilities.

Each access node in the cell site could take various forms. For instance, an access node could be a macro access node configured to provide a broad range of cellular coverage on each of one or more carriers, or a small cell, femtocell, repeater, and/or other such access node configured to provide a narrower range of coverage on each of one or more carriers. Further, if the cell site includes multiple access nodes, the access nodes might share an antenna structure or have antenna structures nearby each other so that downlink transmissions on their respective carriers might combine to produce IMD that may give rise to the issue noted above.

As further shown in FIG. 1, the cell site 12 could interface with at least one core network 20 that provides connectivity with one or more transport networks and/or application servers. For instance, the cell site 12 could include a cell site router (not shown) that interfaces between a baseband unit of each access node 14 and the core network 20, enabling each access node to communicate on core network. In an example implementation, the core network 20 could be an Evolved Packet Core (EPC) network or Next Generation Core (NGC), including includes various gateways, routers, controllers, and other entities to facilitate managing UE mobility and carrying UE communications between the cell cite and one or more transport networks and/or application servers.

As illustrated, for instance, the core network 20 could include a serving gateway (SGW) 22, a packet data network gateway (PGW) 24, and a mobility management entity (MME) 26. With this arrangement, a representative access node could interface with the SGW 26, the SGW 22 could interface with the PGW 24, and the PGW 24 could interface with a transport network 28, so that user-plane communications could flow between the UE and the transport network over a communication path including the access node, the SGW, and the PGW. Further, the access node could interface with the MME 26, and the MME 26 could interface with the SGW, so that the MME could engage in control-plane signaling with the access node and SGW to coordinate setup of user-plane bearers and carrying out other operations.

As further illustrated, the core network 20 and/or transport network 28 could provide connectivity with an Internet Multimedia Subsystem (IMS) 32, which functions to support packet-based real-time media services such as VOP call service for instance. In an example implementation, the IMS could include one or more signaling servers configured to engage in signaling to set up VOP call sessions for served UEs, and the IMS could include one or more media servers to bridge and carry voice call communications for served UEs.

Shown within coverage of cell site 12 are then a number of UEs 34, which could be any of the types discussed above, among other possibilities. At least a representative one of these UEs could be configured to support 4G LTE and/or 5G NR operation and to support VOP communication.

When the representative UE 34 enters into coverage of the example cell site, the UE could initially scan for and detect threshold strong coverage of an access node on a given carrier, and the UE could then connect with the access node on that carrier. As discussed above, for instance, the UE could engage in random-access signaling and RRC signaling with the access node to establish an RRC connection over which the access node will serve the UE. And the access node could establish in data storage a context record for the UE, identifying the RRC connection and indicating the carrier on which the access node is serving the UE.

In addition, the UE could engage in an attachment process with the MME as noted above to register for service and to trigger setup of one or more user-plane bearers for carrying UE communications between the UE and the PGW. For instance, the UE could transmit an attach request via the access node to the MME. And after authenticating the UE, the MME could then coordinate setup for the UE of one or more user-plane bearers, each including a data-radio bearer (DRB) portion extending over the air between the UE and the access node and an access-network portion extending via the SGW between the access node and then PGW.

Each such user-plane bearer could have a quality of service class indicator (QCI) that indicates a type or class of communication to be carried by the bearer and that defines quality-of-service parameters (e.g., guaranteed bit rate (GBR) or non-guaranteed bit rate (non-GBR), priority handling, packet delay budget, and packet error loss rate) appropriate for that type or class of communication. And the access node could store in the UE context record an indication of each bearer established for the UE and the bearer's associated QCI.

Upon initial UE attachment, the MME could coordinate setup for the UE of a default bearer (e.g., QCI 9) for carrying general data communications. Further, based on UE capability data indicating that the UE supports VOP communication, the MME could also coordinate setup for the UE an IMS-signaling bearer (e.g., QCI 5) for carrying VOP call setup signaling (e.g., Session Initiation Protocol (SIP) signaling) between the UE and the IMS, to enable the UE to place and receive VOP calls.

Once the UE is connected and attached, the access node could then serve the UE on the carrier indicated in the UE context record as described above. Namely, as packet data arrives at the PGW for delivery to the UE, the data could flow over an appropriate bearer to the access node, the access node could then provide transmission of the data to the UE on one or more downlink PRBs of the carrier. And when the UE has packet data to transmit, the UE could transmit a scheduling request to the access node, the access node could direct the UE to transmit the data on one or more uplink PRBs of the carrier, and the UE could accordingly transmit the data on the indicated uplink PRB(s), and the access node could forward the data over an appropriate bearer to the PGW.

Further, the access node could configure carrier-aggregation service for the UE, to help provide the UE with increased peak data rate. For instance, the access node could select one or more additional carriers on which the access node operates and could reconfigure the UE's RRC connection to add the selected carrier(s), updating the UE's context record and engaging in RRC-reconfiguration signaling with the UE, so that the access node would then serve the UE on a combination of multiple component carriers.

As noted above, the access node could designate one of the UE's component carriers as the UE's PCell and could designate each additional one of the UE's component carriers as an SCell. For instance, in the RRC-reconfiguration signaling with the UE and in the UE's context record, the access node could designate the PCell with a predefined PCell index number and could designate each SCell with a predefined SCell index number.

As indicated above, the PCell could be used for both downlink and uplink user-plane communication, but each SCell could be used for just downlink user-plane communication. Therefore, the access node designating one of the UE's component carriers as PCell could amount to configuring that carrier for both downlink and uplink use for the UE, and the access node designating another one of the UE's component carriers as SCell could amount to configuring that carrier for just downlink use for the UE.

Once the UE is connected with and served by the access node, the UE may from time to time place or receive VOP calls. For each such call, for instance, the UE could engage in SIP signaling setup signaling with the IMS 32 to set up the VOP call. For instance, the UE could engage in VOP call setup signaling with the IMS via the UE's IMS signaling bearer, which could result in setup of a real-time media session that the IMS would bridge with another call party. Further, the IMS could signal to the core network, the MME could responsively coordinate setup for the UE of a VOP-call bearer (e.g., QCI 1) for carrying the VOP call communication between the UE and the PGW, and the access node could update the UE's context record to indicate that that VOP-call bearer is established for the UE.

With the VOP call and associated VOP-call bearer set up, the UE could then engage in the VOP call. Namely, as the IMS has voice packets to transmit to the UE, those packets could flow from the IMS to the core network and over the UE's VOP-call bearer to the access node, and the access node could schedule and provide transmission of those packets on downlink PRBs to the UE. And as the UE has voice packets to transmit to the IMS, the access node could schedule transmission of those packets on uplink PRBs to the access node, the UE could accordingly transmit the packets to the access node, and the packets could flow over the UE's VOP-call bearer through the core network and to the IMS.

If the UE is served with carrier aggregation configured as described above when the UE engages in such a VOP call, downlink transmission of voice packets to the UE could occur on any or all of the UE's component carriers, but uplink transmission of voice packets from the UE would occur on just the UE's PCell. Therefore, it may be important for the uplink channel of the UE's PCell to provide for high quality voice-packet transmission. As noted above, if there is too much interference on the uplink channel of the UE's PCell, voice-call quality issues could arise. For instance, interference on the uplink channel of the UE's PCell could result in packet loss and delay, which could cause garbled voice, muting, or other issues.

As indicated above, the present disclosure provides for detecting that there is a threshold high extent of IMD on the uplink channel of the UE's PCell and for responsively swapping the UE's PCell with one of the UE's SCells, so as to provide the UE with a different and optimally better uplink PCell channel on which to transmit voice packets. Here, the converting of an SCell into the PCell effectively reconfigures that carrier from being a downlink-only carrier for service of the UE to being downlink/uplink carrier for service of the UE.

In an example implementation, some or all aspects of this process could be done at the time of VOP call setup for the UE, such as in response to setup of a VOP-call bearer (e.g., QCI-1 bearer) for the UE or in response to one or more other indications that a VOP call is about to be set up for the UE, is being set up for the UE, or has been set up for the UE, among other possibilities.

Further, in the example implementation, a computing system at the cell site and/or in the core network could carry out and/or coordinate this process. For instance, the process could be implemented by the UE's serving access node, an adjunct processing system at the cell site, an element management system in the core network, the MME, and/or one or more entities. Without limitation, the remainder of the disclosure will walk through an example implementation by the UE's serving access node.

IMD, particularly third order intermodulation products, could arise from the combination of concurrent RF transmissions on separate frequencies. In particular, if cell site 12 provides concurrent downlink transmissions on respective downlink frequencies $F_1$ and $F_2$ especially from collocated or close antenna structures, those concurrent downlink transmission may combine to produce intermodulation frequency products at frequencies $F_{IM1}$ and $F_{IM2}$, where $F_{IM1}=2F_1-F1_2$, and $F_{IM2=42}=2F2-F1_1$. Further, the power level of each such instance of 1 MB could be determined as a function of the power level of the two downlink transmissions.

In the example implementation, the UE's serving access node could determine the extent of 1 MB that falls within the uplink channel of the UE's PCell, by evaluating and tracking concurrent downlink transmissions from the cell site over time. The concurrent downlink transmissions from the cell site could include downlink transmissions by the access node itself and/or downlink transmissions by one or more other access nodes in the cell site. Further, the concurrent downlink transmissions from the cell site could include downlink transmissions to the UE at issue and/or downlink transmissions to one or more other UEs or for one or more other purposes.

As a non-limiting example, the access node could conduct this analysis with respect to individual downlink channels from the cell site. For each downlink channel on which the access node itself provides service, the access node could deem an instance of downlink communication on that channel to occur respectively as each subframe in which the access node schedules and provides downlink transmission on the channel, or perhaps each subframe in which the access node schedules and provides transmission on at least a threshold number of PRBs or other resources of the channel. And for each other downlink channel from the cell site, the access node could receive signaling from a respective other access node in the cell site, reporting instances of downlink transmission on the downlink channel, also perhaps as each subframe in which the other access node provides downlink transmission on the channel or provides transmission on at least a threshold number of PRBs or other resources of the channel. Each other access node in the cell site could be programmed to provide these reports automatically (e.g., periodically) or in response to requests from the access node conducting the analysis.

When there is concurrent transmission on two such downlink channels having representative channel frequencies (e.g., center frequencies) $F_1$ and $F_2$, the frequencies $F_{IM1}$ and $F_{IM2}$ of the resulting IMD could be computed as described above. Thus, by tracking instances of transmission on pairs of downlink channels from the cell site, the access node could regularly compute the frequencies of such resulting IMD. And the access node could determine whether the IMD falls within the frequency range of the uplink channel of the UE's PCell.

Over a sliding window of time, perhaps on the order of seconds or minutes, the access node could track such instances of IMD determined to fall within the uplink channel of the UE's PCell. And the access node could determine whether, over a most recent sliding window for instance, the quantity, rate, or other extent of such instances is at least as high as a predefined threshold level deemed by engineering design to be an interference problem on that uplink channel.

If and when the access node thereby determines that the extent of IMD on the uplink channel of the UE's PCell is threshold high, the access node could then responsively swap the UE's PCell with an SCell of the UE's connection, in an effort to improve the quality of the UE's uplink voice communication.

To perform this carrier swap, the access node could update the UE's context record and engage in RRC reconfiguration signaling with the UE, to designate as the UE's PCell a carrier that was formerly designated as an SCell of the UE and to designate as an SCell of the UE the carrier that was formerly designated as the PCell of the UE. The access node could then continue to serve the UE with carrier aggregation, but now with the swapped PCell and SCell. And as the UE engages in its VOP call, the UE's uplink voice communication would be scheduled on the uplink channel of the UE's new PCell.

In an example implementation, the access node could conduct a similar IMD analysis with respect to the uplink channel respectively of each of at least each other carrier that is currently set as an SCell of the UE's connection, in order to track the extent of IMD on each such other uplink channel. When the access node determines that the extent of IMD on the uplink channel of the UE's PCell is threshold high, the access node could then decide to proceed with swapping that PCell with a given SCell of the UE's connection as long as the access node has determined further that the extent of IMD on the uplink channel of that SCell is not threshold high. That is, the access node could consider the IMD on the uplink channel of the SCell being not threshold high as a condition precedent to the access node swapping that SCell with the UE's PCell. That way, the access node could help ensure that the carrier swap may result in better uplink voice communication from the UE.

FIG. 2 is next a flow chart depicting a method that can be carried out in accordance with the present disclosure to control carriers on which an access node of a cell site serves a UE when the access node provides the UE with carrier-aggregation service on a connection encompassing at least a first carrier configured as a PCell for the carrier-aggregation service and a second carrier configured as an SCell for the carrier-aggregation service.

As shown in FIG. 2, at block 36, the method includes making a first determination that there is a predefined threshold high extent of intermodulation distortion on an uplink channel of the first carrier resulting from concurrent downlink transmissions from the cell site and making a second determination that the UE will engage in a VOP communication. And at block 38, the method includes, responsive to a combination of at least the first determination and the second determination, swapping the first carrier and second carrier in the connection, with the swapping making the second carrier the PCell of the carrier-aggregation service and making the first carrier the SCell of the carrier-aggregation service.

In line with the discussion above, the act of making the first determination that there is the predefined threshold high extent of intermodulation distortion on the uplink channel of the first carrier resulting from concurrent downlink transmissions from the cell site could involve (i) tracking instances of concurrent downlink transmissions from the cell site resulting in intermodulation distortion that falls within a frequency range of the uplink channel of the first carrier and (ii) determining, based on the tracking, that there are at least the predefined threshold extent of the instances.

Further, as discussed above, the act of tracking the instances of concurrent downlink transmissions from the cell site resulting in intermodulation distortion that fall within the frequency range of the uplink channel of the first carrier could involve, for each of multiple pairs of downlink transmissions from the cell site, (i) computing based on frequencies of the downlink transmissions a frequency of an intermodulation product that could result from a combination of the downlink transmissions, (ii) determining that the computed frequency falls within the frequency range of the uplink channel of the first carrier.

In addition, as discussed above, the downlink transmissions at issue in this process could be transmissions to other than the UE, and one or more or of the downlink transmissions could be from the access node. And as also discussed above, the method could be implemented by the access node.

Further, as discussed above, one or more of the downlink transmissions could come from one or more other access nodes in the cell site. And the method could additionally include receiving, from the one or more other access nodes, reports of the one or more downlink transmission from the one or more other access nodes, in which case the tracking of instances of concurrent downlink transmissions from the cell site resulting in intermodulation distortion that falls within a frequency range of the uplink channel of the first carrier could be based at least in part on the received reports.

Still further, as discussed above, the act of making the second determination that the UE will engage in a VOP communication could involve detecting setup for the UE of a VOP-call bearer indicating that the UE will engage in the VOP communication.

Figure 3:
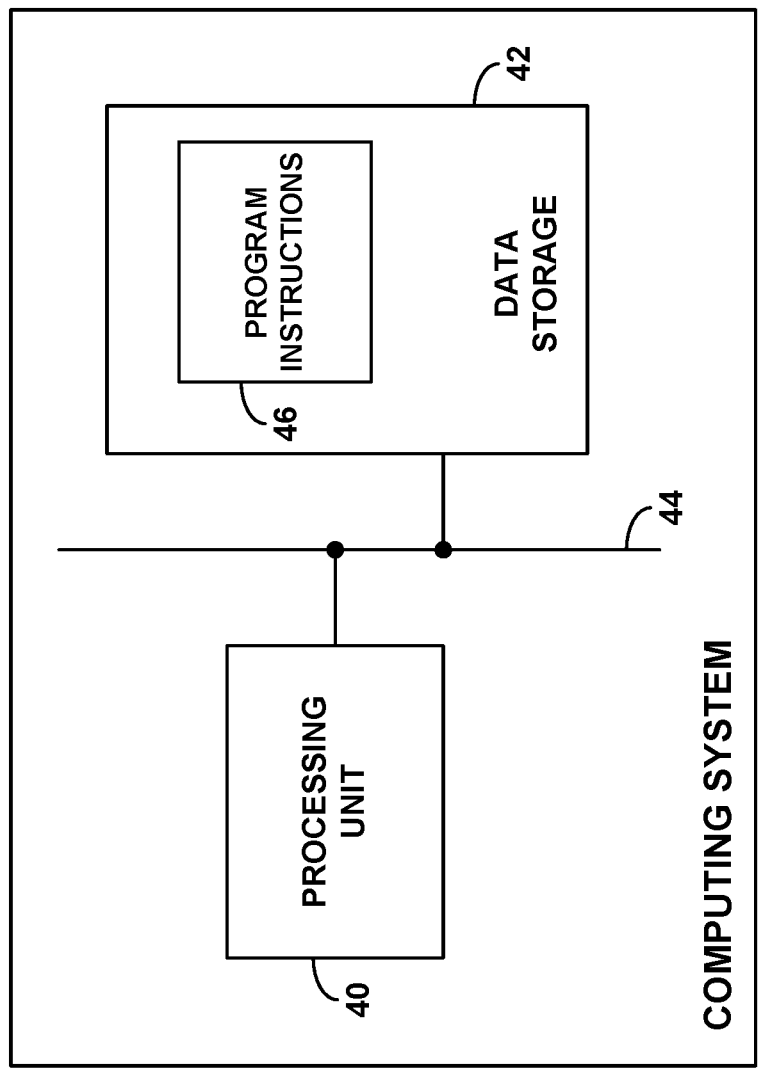
FIG. 3 is a simplified block diagram of an example computing system operable in accordance with the disclosure.

FIG. 3 is next a block diagram of an example computing system that could be configured to carry out operations such as those discussed above, to control carriers on which an access node of a cell site serves a UE when the access node provides the UE with carrier-aggregation service on a connection encompassing at least a first carrier configured as a PCell for the carrier-aggregation service and a second carrier configured as an SCell for the carrier-aggregation service. As noted above, this computing system could be implemented at various locations in the wireless communication system.

As shown in FIG. 3, the example computing system includes a processing unit 40 and non-transitory data storage 42, which could be integrated together or interconnected by a system bus, network, or other connection mechanism 44. The processing unit 40 could comprise one or more general purpose processors (e.g., microprocessors) and/or one or more special purpose processors (e.g., application specific integrated circuits). And the data storage 42 could comprise one or more volatile and/or non-volatile storage components (e.g., magnetic, optical, or flash storage).

As further shown, the data storage 42 could hold program instructions 46. These program instructions could be executable by the processing unit 40 to carry out operations such as those discussed above, among other possibilities.

For instance, these operations could include (i) making a first determination that there is a predefined threshold high extent of intermodulation distortion on an uplink channel of the first carrier resulting from concurrent downlink transmissions from the cell site, (ii) making a second determination that the UE will engage in a VOP communication, and (iii) responsive to at least a combination of the first determination and the second determination, causing the first carrier and second carrier to be swapped in the connection, with the swapping making the second carrier the PCell of the carrier-aggregation service and making the first carrier the SCell of the carrier-aggregation service. Here, the act of causing the first carrier and second carrier to be swapped could involve directing and thus causing the access node to carry out this swapping.

Various other features discussed above can be implemented in this context, and vice versa.

Figure 4:
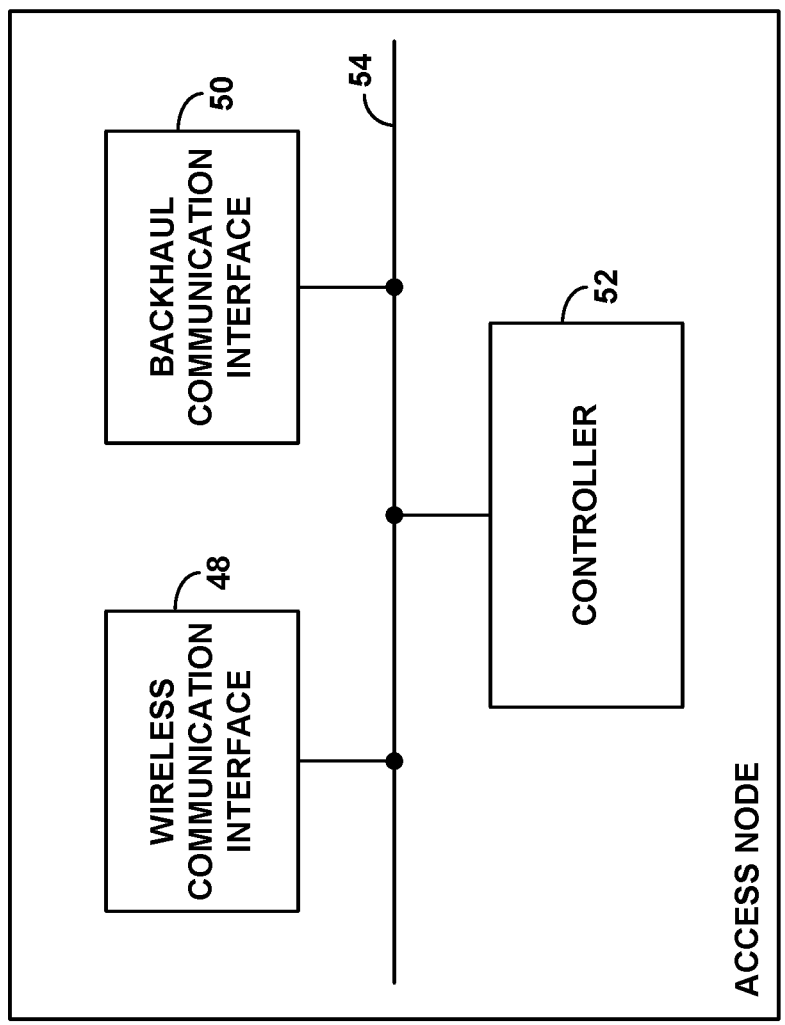
FIG. 4 is a simplified block diagram of an example access node operable in accordance with the disclosure.

Finally, FIG. 4 is a simplified block diagram of an example access node that could operate as discussed above. As shown in FIG. 4, the example access node includes a wireless communication interface 48, a backhaul interface 50, and a controller 52, which could be integrated together or communicatively linked together by a system bus, network, or other connection mechanism 54.

In this example arrangement, the wireless communication interface 48 could be configured to provide cellular coverage and to engage in air interface communication with served UEs. As such, wireless communication interface 48 could comprise an antenna structure, which could be tower mounted or could take other forms, and associated components such as power amplifiers and a wireless transceiver, to facilitate providing a coverage area on multiple carriers as shown in FIG. 1 and engaging in air-interface communication according to a RAT such as any of those noted above.

Further, the backhaul interface 50 could comprise a wired or wireless interface, such as an Ethernet network communication interface, configured to support communication with other entities, such as with various core-network entities and other access nodes for instance.

Controller 52 could then comprise control logic to cause the access node to carry out particular operations including those described herein. As such, the controller 52 could take various forms, including but not limited to a processing unit including one or more processors (e.g., one or more general purpose microprocessors and/or one or more dedicated processing units) and non-transitory data storage (e.g., one or more volatile and/or non-volatile storage components, such as magnetic, optical, or flash storage) holding program instructions executable by the processing unit to cause the processing unit and thus the access node to carry out various operations described herein.

It should also be understood that the present disclosure additionally contemplates a non-transitory computer readable medium that stores, has encoded thereon, or otherwise embodies program instructions executable to carry out such operations as well.

Exemplary embodiments have been described above. Those skilled in the art will understand, however, that changes and modifications may be made to these embodiments without departing from the true scope and spirit of the invention.

We claim:

1. A method for controlling carriers on which an access node of a cell site serves a user equipment device (UE) when the access node provides the UE with carrier-aggregation service on a connection encompassing at least a first carrier configured as a primary cell (PCell) for the carrier-aggregation service and a second carrier configured as a secondary cell (SCell) for the carrier-aggregation service, the method comprising:
making a first determination that there is a predefined threshold high extent of intermodulation distortion on an uplink channel of the first carrier resulting from concurrent downlink transmissions from the cell site;
making a second determination that the UE will engage in a voice-over-packet (VOP) communication; and
responsive to a combination of at least the first determination and the second determination, swapping the first carrier and second carrier in the connection, wherein the swapping makes the second carrier the PCell of the carrier-aggregation service and makes the first carrier the SCell of the carrier-aggregation service.

2. The method of claim 1, wherein making the first determination that there is the predefined threshold high extent of intermodulation distortion on the uplink channel of the first carrier resulting from concurrent downlink transmissions from the cell site comprises:
tracking instances of concurrent downlink transmissions from the cell site resulting in intermodulation distortion that falls within a frequency range of the uplink channel of the first carrier; and
determining, based on the tracking, that there are at least the predefined threshold extent of the instances.

3. The method of claim 2, wherein tracking the instances of concurrent downlink transmissions from the cell site resulting in intermodulation distortion that falls within the frequency range of the uplink channel of the first carrier comprises:
for each of multiple pairs of downlink transmissions from the cell site, (i) computing based on frequencies of the downlink transmissions a frequency of an intermodulation product that could result from a combination of the downlink transmissions, (ii) determining that the computed frequency falls within the frequency range of the uplink channel of the first carrier.

4. The method of claim 2, wherein the downlink transmissions are transmissions to other than the UE.

5. The method of claim 2, wherein one or more of the downlink transmissions is from the access node.

6. The method of claim 2, wherein the method is carried out by the access node that is serving the UE.

7. The method of claim 2, wherein one or more of the downlink transmissions come from one or more access nodes in the cell site other than the access node that is serving the UE, and wherein the method further comprises:
receiving, from the one or more other access nodes, reports of the one or more downlink transmission from the one or more other access nodes,
wherein the tracking is based at least in part on the received reports.

8. The method of claim 1, wherein making the second determination that the UE will engage in a VOP communication comprises detecting setup for the UE of a VOP-call bearer indicating that the UE will engage in the VOP communication.

9. The method of claim 1, further comprising:
making a third determination that there is not threshold high intermodulation distortion on an uplink channel of the second carrier,
wherein the swapping of the first carrier and second carrier in the connection is responsive to at least a combination of the first determination, the second determination, and the third determination.

10. A computing system for controlling carriers on which an access node of a cell site serves a user equipment device (UE) when the access node provides the UE with carrier-aggregation service on a connection encompassing at least a first carrier configured as a primary cell (PCell) for the carrier-aggregation service and a second carrier configured as a secondary cell (SCell) for the carrier-aggregation service, the computing system comprising:
a processing unit;
non-transitory data storage; and
program instructions stored in the non-transitory data storage and executable by the processing unit to carry out operations including:

making a first determination that there is a predefined threshold high extent of intermodulation distortion on an uplink channel of the first carrier resulting from concurrent downlink transmissions from the cell site, making a second determination that the UE will engage in a voice-over-packet (VOP) communication, and responsive to a combination of at least the first determination and the second determination, causing the first carrier and second carrier to be swapped in the connection, wherein the swapping makes the second carrier the PCell of the carrier-aggregation service and makes the first carrier the SCell of the carrier-aggregation service.

11. The computing system of claim 10, wherein making the first determination that there is the predefined threshold high extent of intermodulation distortion on the uplink channel of the first carrier resulting from concurrent downlink transmissions from the cell site comprises:

tracking instances of concurrent downlink transmissions from the cell site resulting in intermodulation distortion that falls within a frequency range of the uplink channel of the first carrier; and determining, based on the tracking, that there are at least the predefined threshold extent of the instances.

12. The computing system of claim 11, wherein tracking the instances of concurrent downlink transmissions from the cell site resulting in intermodulation distortion that falls within the frequency range of the uplink channel of the first carrier comprises:

for each of multiple pairs of downlink transmissions from the cell site, (i) computing based on frequencies of the downlink transmissions a frequency of an intermodulation product that could result from a combination of the downlink transmissions, (ii) determining that the computed frequency falls within the frequency range of the uplink channel of the first carrier.

13. The computing system of claim 11, wherein the downlink transmissions are transmissions to other than the UE.

14. The computing system of claim 11, wherein one or more of the downlink transmissions is from the access node.

15. The computing system of claim 11, wherein one or more of the downlink transmissions come from one or more other access nodes in the cell site other than the access node that is serving the UE, and wherein the operations further include:

receiving, from the one or more other access nodes, reports of the one or more downlink transmission from the one or more other access nodes, wherein the tracking is based at least in part on the received reports.

16. The computing system of claim 10, wherein making the second determination that the UE will engage in a VOP communication comprises detecting setup for the UE of a VOP-call bearer indicating that the UE will engage in the VOP communication.

17. An access node comprising:

an antenna structure through which to engage in air-interface communication;

a controller for controlling carriers on which the access node serves a user equipment device (UE) when the access node provides the UE with carrier-aggregation service on a connection encompassing at least a first carrier configured as a primary cell (PCell) for the carrier-aggregation service and a second carrier configured as a secondary cell (SCell) for the carrier-aggregation service, wherein the controller is configured to make a first determination that there is a predefined threshold high extent of intermodulation distortion on an uplink channel of the first carrier resulting from concurrent downlink transmissions from a cell site at which the access node operates, wherein the controller is configured to make a second determination that the UE will engage in a voice-over-packet (VOP) communication, and wherein the controller is configured to respond to a combination of at least the first determination and the second determination by causing the first carrier and second carrier to be swapped in the connection, wherein the swapping makes the second carrier the PCell of the carrier-aggregation service and makes the first carrier the SCell of the carrier-aggregation service.

18. The access node of claim 17, wherein the controller comprises a processing unit, non-transitory data storage, and program instructions stored in the data storage and executable by the processing unit.

19. The access node of claim 17, wherein making the first determination that there is the predefined threshold high extent of intermodulation distortion on the uplink channel of the first carrier resulting from concurrent downlink transmissions from the cell site comprises:

tracking instances of concurrent downlink transmissions from the cell site resulting in intermodulation distortion at a frequency that falls within a frequency range of the uplink channel of the first carrier; and determining, based on the tracking, that there are at least the predefined threshold extent of the instances.

20. The access node of claim 19, wherein one or more of the downlink transmissions come from one or more other access nodes in the cell site, and wherein the operations further include:

receiving, from the one or more other access nodes, reports of the one or more downlink transmission from the one or more other access nodes, wherein the tracking is based at least in part on the received reports.

* * * * *